(12) United States Patent
Tanaka

(10) Patent No.: US 7,496,447 B2
(45) Date of Patent: Feb. 24, 2009

(54) MAP DISPLAY DEVICE

(75) Inventor: Hiromichi Tanaka, Tokai (JP)

(73) Assignee: DENSO CORPORATION, Kariya (JP)

( * ) Notice: Subject to any disclaimer, the term of this patent is extended or adjusted under 35 U.S.C. 154(b) by 476 days.

(21) Appl. No.: 11/199,230

(22) Filed: Aug. 9, 2005

(65) Prior Publication Data

US 2006/0047420 A1  Mar. 2, 2006

(30) Foreign Application Priority Data

Aug. 31, 2004  (JP) .............. 2004-252283

(51) Int. Cl.
*G01C 21/00* (2006.01)
*G09B 29/00* (2006.01)
(52) U.S. Cl. .................. 701/208; 701/211; 340/995.12
(58) Field of Classification Search ........... None
See application file for complete search history.

(56) References Cited

U.S. PATENT DOCUMENTS

| 4,514,810 A * | 4/1985 | Ito et al. ............ 701/208 |
| 5,243,528 A * | 9/1993 | Lefebvre ............ 701/211 |
| 5,614,895 A * | 3/1997 | Ohomori et al. ...... 340/995.15 |
| 6,047,234 A * | 4/2000 | Cherveny et al. ..... 701/200 |
| 6,154,152 A * | 11/2000 | Ito .................. 340/988 |
| 6,263,276 B1 * | 7/2001 | Yokoyama et al. ..... 701/207 |
| 2005/0038595 A1 * | 2/2005 | Yokota et al. ....... 701/200 |
| 2005/0102098 A1 * | 5/2005 | Montealegre et al. .. 701/209 |

FOREIGN PATENT DOCUMENTS

| JP | A-04-362683 | | 12/1992 |
| JP | A-08-271272 | | 10/1996 |
| JP | A-2000-180187 | | 6/2000 |
| JP | 2003-130656 | * | 5/2003 |
| JP | A-2003-130651 | | 5/2003 |
| JP | 2004-150827 | * | 5/2004 |
| JP | 2004-251790 | * | 9/2004 |

\* cited by examiner

*Primary Examiner*—Michael J. Zanelli
(74) *Attorney, Agent, or Firm*—Posz Law Group, PLC

(57) ABSTRACT

A map display device includes a display for displaying map data, a position detector for detecting a position of a subject vehicle, a map data storage for storing the map data and a controller for processing the map data. The controller determines whether the subject vehicle is traveling outside of a road on a map displayed on the display based on the current position of the subject vehicle. The controller updates the map data upon receiving an affirmative response for confirmation of an update of a portion of the map data including a path of the current position of the subject vehicle on the map.

13 Claims, 7 Drawing Sheets

DISTINGUISHING COLOR AND/OR BLINKING LINE

MAP DISPLAY DEVICE

CROSS REFERENCE TO RELATED APPLICATION

This application is based on and claims the benefit of priority of Japanese Patent Application No. 2004-252283 filed on Aug. 31, 2004, the disclosure of which is incorporated herein by reference.

FIELD OF THE INVENTION

The present invention generally relates to a map display device for displaying a road map.

BACKGROUND OF THE INVENTION

In recent years, an automotive navigation device is used to display a current position of a subject vehicle at a corresponding position on a map. The navigation device also determines whether the subject vehicle is traveling on a road based on a comparison between the current position of the subject vehicle and the corresponding position on the map (refer to a Japanese Patent Document JP-A-2003-130651).

The navigation device uses map data that is derived from data collection procedure such as an aerial photo, a survey of a site or the like. Therefore, the map data does not always reflect a current condition of a road. That is, for example, a road constructed after the map data collection does not appear on the map. Thus, the current position of the subject vehicle goes out of a road on the map shown in the navigation device when the subject vehicle travels on a newly constructed road that is not drawn on the map.

A user of the navigation device recognizes that the subject vehicle travels on the newly constructed road when the current position of the vehicle goes out of the road on the map. In this case, the user can obtain an updated map data at a cost and trouble on the user's side. That is, usability of the map decreases when the subject vehicle travels on the newly constructed road without having the updated map data, because the current position of the subject vehicle displayed on the map travels outside of the road.

SUMMARY OF THE INVENTION

In view of the above-described and other problems, it is an object of the present invention to provide a map display device that displays a vehicular swept path outside of a road on a map for including the path as a new road at a user's disposal to improve usability of the map.

The map display device of the present invention detects a current position of a subject vehicle detected by a current position detection unit, displays the current position on the map retrieved from a map data storage unit, and determines whether the current position of the subject vehicle exists in a road on the map. The map display device confirms the user whether a vehicular swept path outside of the road on the map should be incorporated in the map as new map data when the subject vehicle is determined to be traveling outside of the road. The vehicular swept path is incorporated in the map when the user affirmatively confirms an intention that he/she wants to incorporate the path as the new map data describing a new road.

The map display device updates a road map based on a user's input in the above-described manner. Therefore, the usability of the map is improved by the map display device of the present invention that incorporatively updates the new road on the map by itself.

The map display device uses various criteria when it confirms the user whether the map should be updated. That is, the map display device displays an input window that asks the user that the map data should incorporate the vehicular swept path outside of the road on the map when a length of the swept path outside of the road on the map reaches a predetermined value, or when the subject vehicle is traveling outside of the road for more than a predetermined period. In this manner, the map display device excludes a short trip of the subject vehicle out of the road as an exception.

The map display device displays the input window at various timing for the user's input, i.e., confirmation for an update of the map data. That is, the map display device displays the input window when the subject vehicle goes out of the road on the map, when the subject vehicle returns to the road on the map, or when the subject vehicle is, for example, started after parking. The input window is displayed for a predetermined period. The period is considered as a wait time that enables the user to safely input the confirmation for the update of the map data.

The map display device records the vehicular swept path outside of the road when a speed of the vehicle outside of the road is greater than a predetermined value. The map display device displays the input window when the subject vehicle slows down to a speed below a predetermined value afterward.

The map display device updates the map data by using the map data delivered from a data center. The map data may also be updated by using the recorded vehicular swept path. The user of the map display device chooses an update method of the map data.

The map display device distinguishably displays the vehicular swept path outside of the road. In this manner, the vehicular swept path outside of the road on the map can be clearly recognized by the user of the map display device.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

A map display device of the present invention used in a navigation system is described with reference to the drawings.

Figure 1:
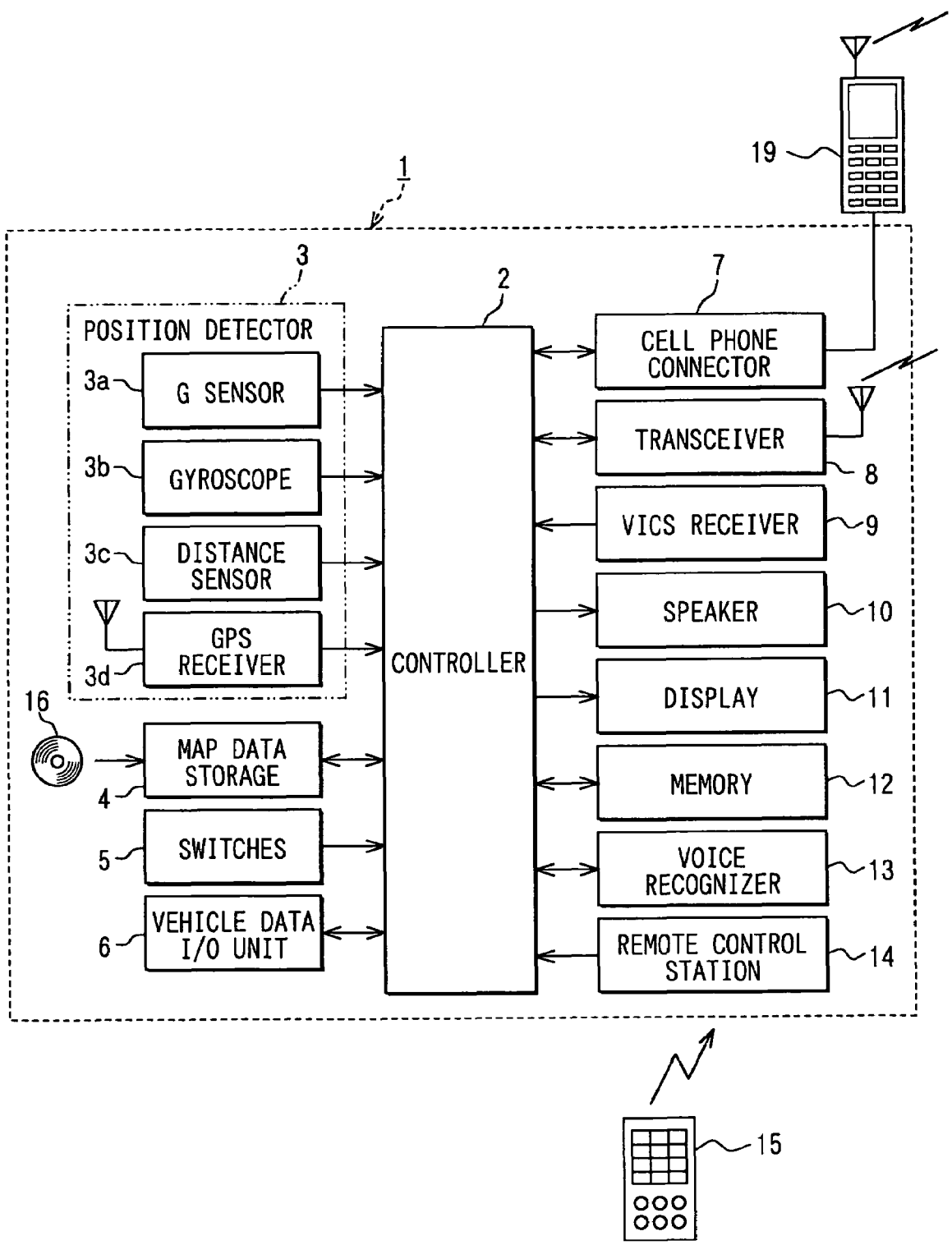
FIG. 1 is a block diagram of a map display device in an embodiment of the present invention.
Figure 2:
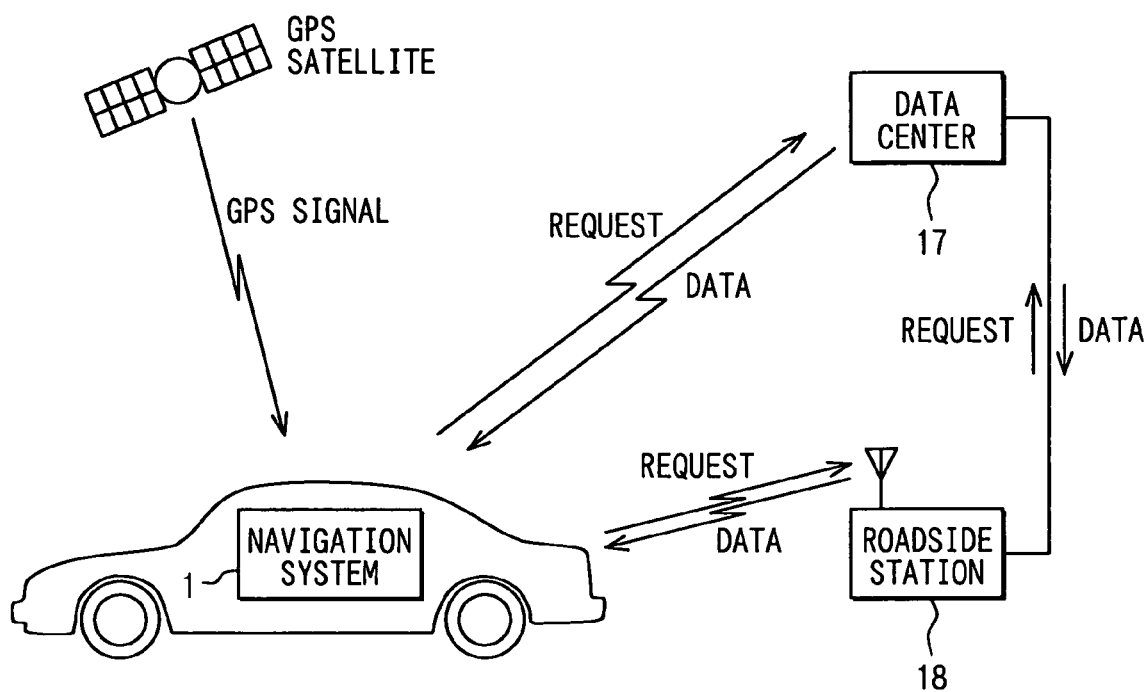
FIG. 2 is an illustration of an operation scheme of the map display device.

FIG. 1 shows a block diagram of a map display device in an embodiment of the present invention, and FIG. 2 shows an illustration of an operation scheme of the map display device.

A navigation system 1 includes a controller 2, a position detector 3, a map data storage 4, switches 5, a vehicle data I/O unit 6, a cell phone connecting unit 7, a transceiver 8, a VICS receiver 9, a speaker 10, a display 11, a memory 12, a voice recognizer 13, a remote control station 14 and a remote controller 15.

The controller 2 includes a CPU, a ROM, a RAM, an I/O interface and a bus connecting all those devices (not shown in the figure). The controller 2 controls substantially all operations of the navigation system 1. The position detector 3 includes a G sensor 3a, a gyroscope 3b, a distance sensor 3c and a GPS receiver 3d.

A signal from each of the devices included in the position detector 3 respectively has a different kind detection error. The controller 2 accepts detection signals from those sensors and the like in the position detector 3 to detect, with an accuracy, a current position, a traveling direction, a speed, a travel distance or the like based on the detection signals from those sensors and the like. The navigation system 1 may further include a steering wheel rotation sensor or a tire rotation sensor. The navigation system 1 does not necessarily include all of the above-described devices. The navigation system 1 detects a current position of a subject vehicle by using available devices in a required accuracy for navigation or the like.

The map data storage 4 stores, for example, map data retrieved either from a storage medium 16 such as a DVD-ROM or the like, from a transceiver 18 through a wireless communication, or from a cell phone 19 through a communication network (partly shown in FIG. 2). The storage medium 16 may include, for example, a HDD or a memory card.

The switches 5 include, for example, mechanical switches disposed around the display 11, and a touch switch disposed on a color liquid crystal display panel of the display 11. The vehicle data I/O unit 6 serves as an interface from the navigation system 1 to ECUs used in the subject vehicle for data exchange. The cell phone connector 7 connects a cell phone 19 to the navigation system 1 for data communication to/from a data center 17 through the communication network. The transceiver 8 communicates with a roadside station 18 for data communication to/from the data center 17 through the wireless communication. The VICS receiver 9 receives VICS information from an external source of information.

The speaker 10 outputs, for example, a voice for navigation or the like. The display 11 includes, for example, a color liquid crystal display panel, for displaying a position mark on a map that corresponds to a current position of the subject vehicle. The display 11 may use a plasma display panel, an organic EL display panel or the like.

The memory 12 includes, for example, a detachable flash memory card or the like. The voice recognizer 13 recognizes a voice of a user through a microphone by using a voice recognition algorithm. The remote control station 14 receives operation signals from a remote controller 15 through a radio wave, and outputs it to the controller 2.

Figure 3:
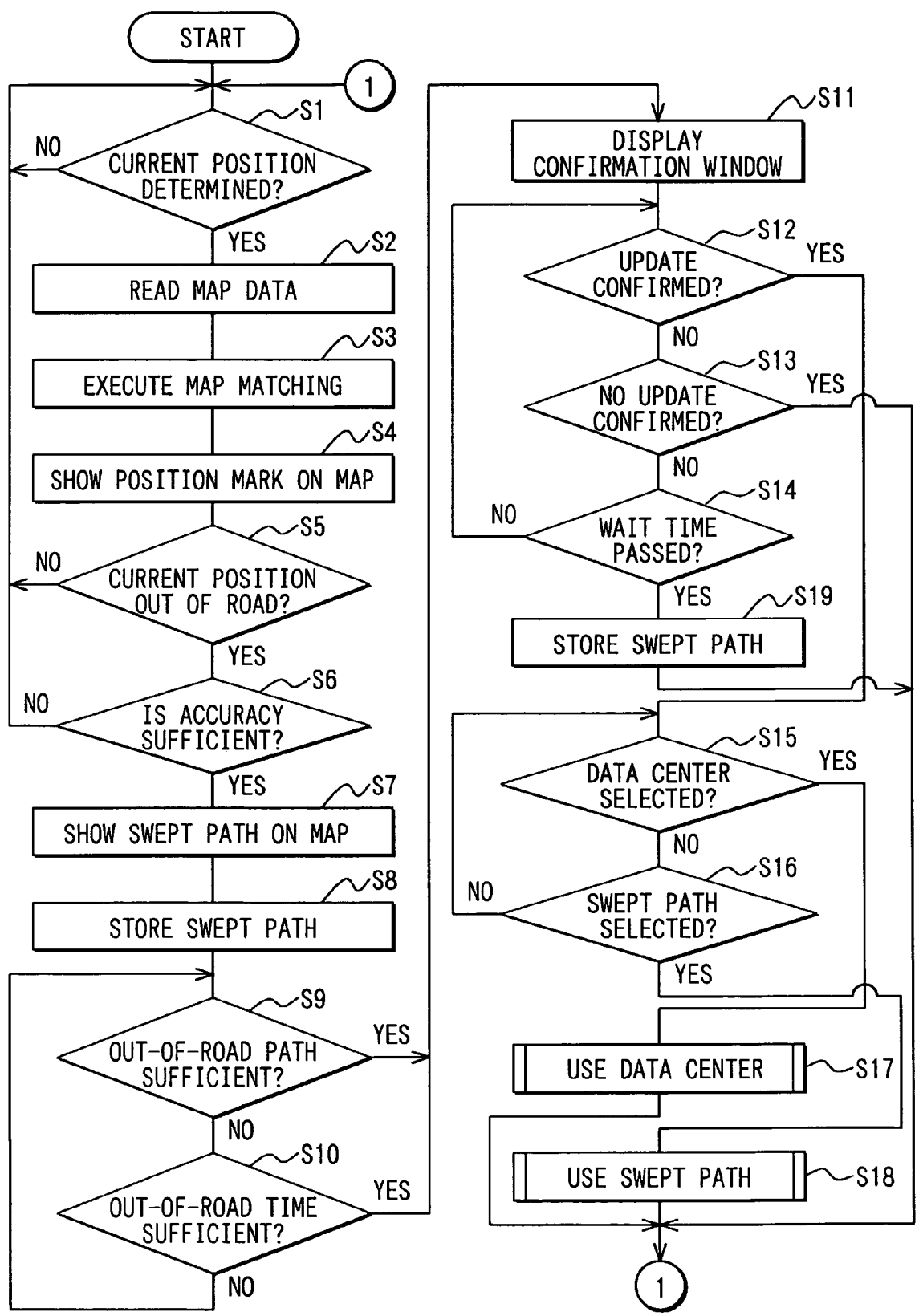
FIG. 3 is a flowchart of a main process of the map display device.

The operation of the navigation system 1 is described with reference to the FIGS. 3 to 8. FIGS. 3 and 4 show flowcharts of a process executed in the controller 2. In this case, the user of the navigation system 1 uses an update method window shown in FIG. 5 in advance to specify a map data update method from among option buttons of a "Data Center" button 20a, a "Swept Path" button 20b and a "No Update" button 20c displayed in the window. A source of map data is also specified in advance in a same manner as an assumption for the present embodiment.

The controller 2 receives signals from each component of the position detector 3 to determine the current position of the subject vehicle by complementarily correcting errors in the signals in step S1. The controller 2 retrieves map data from the map data storage 4 in step S2, and processes the retrieved map data with the current position of the subject vehicle by a map matching in step S3 and displays the position mark of the current position of the subject vehicle on the map in step S4.

The controller 2 determines whether the current position of the subject vehicle is in a road on the map in step S5 based on the map matching. The process executed in the controller 2 returns to step S1 when the current position of the subject vehicle is in the road on the map (NO in step S5). The process in the controller 2 proceeds to step S6 to determine accuracy of the current position when the current position of the subject vehicle is not in the road on the map (YES in step S5). The accuracy of positioning is determined in step S6, for example, based on a number of GPS satellites available at a time of position determination.

Figure 6A:
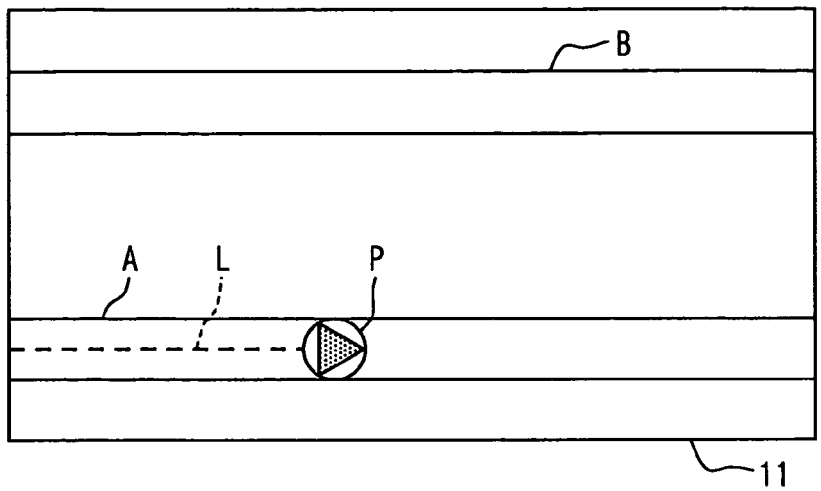
FIGS. 6A to 6C are illustrations of vehicular swept paths shown on the maps.
Figure 6B:
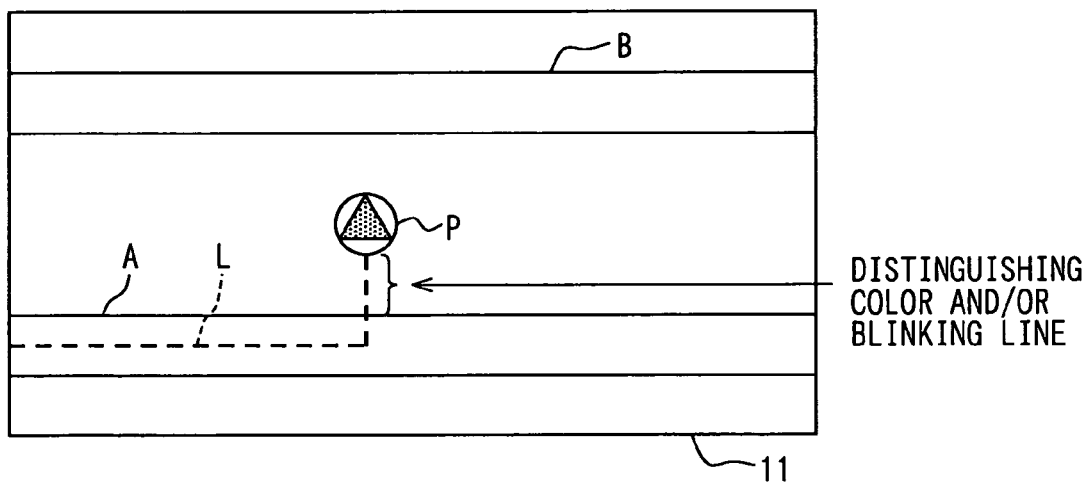
Figure 6C:
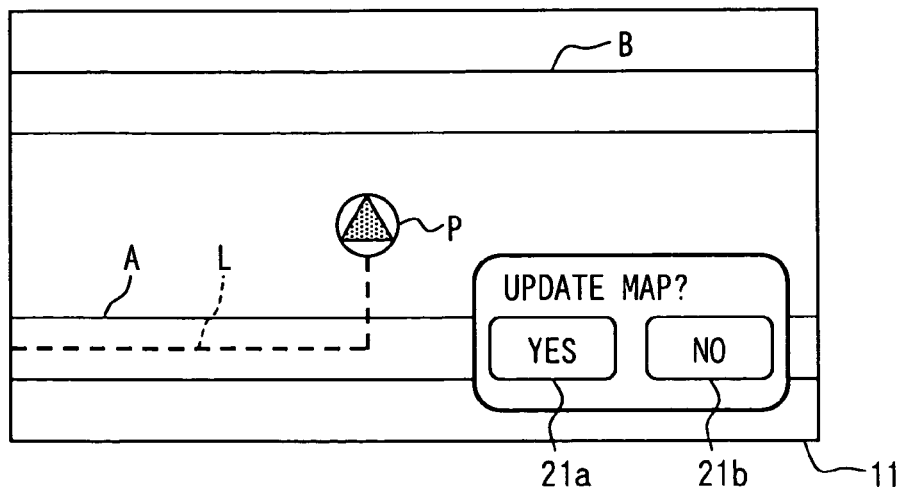

The process in the controller 2 proceeds to step S7 to distinguishably display a vehicular swept path of the subject vehicle on the map when the accuracy of the current position is sufficient (YES in step S6). More practically, the controller 2 displays the vehicular swept path in a distinguishing color and/or in a blinking manner on the map as shown in FIG. 6B. In this manner, the vehicular swept path is distinguished from the road on the map in FIG. 6A. The controller 2 temporarily stores the vehicular swept path in the memory 12 in step S8. In FIGS. 6A to 6C, an "A" and a "B" indicate the roads, a "P" indicates the position mark and an "L" indicates the vehicular swept path.

Then, the controller 2 determines whether a distance of the vehicular swept path that lies outside of the road on the map has reached a predetermined value in step S9. The controller 2 also determines whether the subject vehicle has been traveling outside of the road for more than a predetermined period in step S10. The process in the controller 2 displays, on the display 11, a confirmation window for updating map data as shown in FIG. 6C in step S11 when the distance has reached the predetermined value (YES in step S9) or the vehicle has been traveling outside of the road for more than the predetermined period (YES in step S10).

The user either selects a "YES" button 21a for updating the map data, or selects a "NO" button 21b for not updating the map data in the confirmation window. The controller 2 counts an elapsed time from a display of the confirmation window in step S14 while it waits for an input in the confirmation window in steps S12 and S13. The controller 2 updates the map data in a method specified in advance when it detects selection of "YES" button 21a (YES in step S12) before the elapsed time reaches a predetermined value. The method of update is determined in steps S15 and S16. The method uses either the map data from the data center 17 for an update or the vehicular swept path stored in the memory 12 for an update.

The controller 2 updates the map data with the data from the data center 17 in step S17 when the update is detected in step S15 (YES in step S15), or updates the map data with the vehicular swept path in step S18 when the update is detected in step S16 (YES in step S16).

Figure 4A:
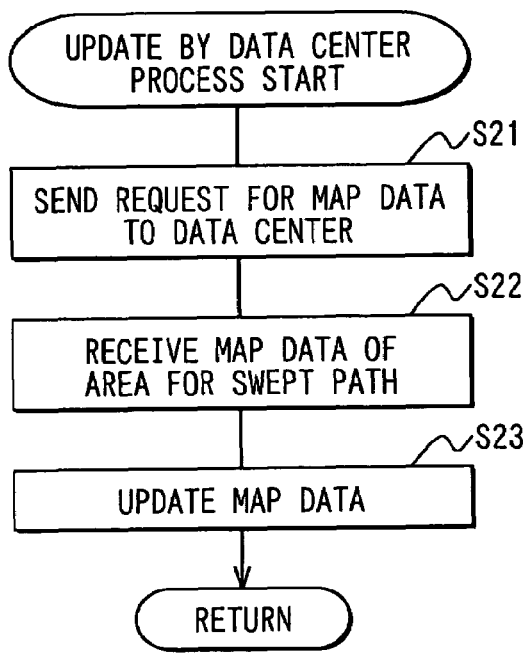
FIG. 4A is a flowchart of a sub-process of the map display device.

The controller 2 sends a request for retrieval of the map data to the data center 17 through the cell phone 19 or the transceiver 8 in step S21 in FIG. 4A, when the map data update method is specified as the "Data Center." The controller 2 receives the requested map data through the cell phone 19 or the transceiver 8, and stores the data in the map data storage 4 in step S22. Then, the controller 2 updates the map data by using the requested map data in step S23.

A portion of the map that includes the vehicular swept path outside of the road is updated in this manner. The portion of the map being updated is delivered from the data center 17 in a unit of, for example, a predetermined square portion of the map.

Figure 4B:
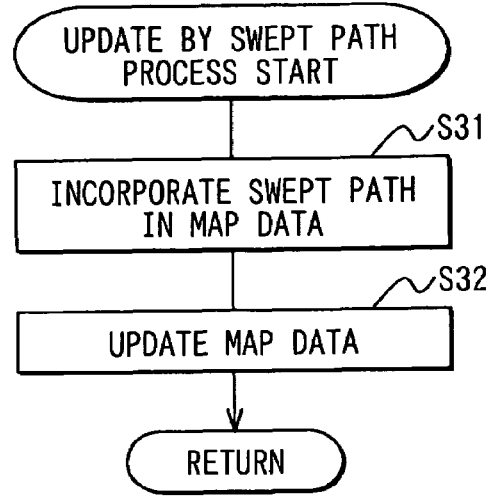
FIG. 4B is a flowchart of another sub-process of the map display device.
Figure 5:
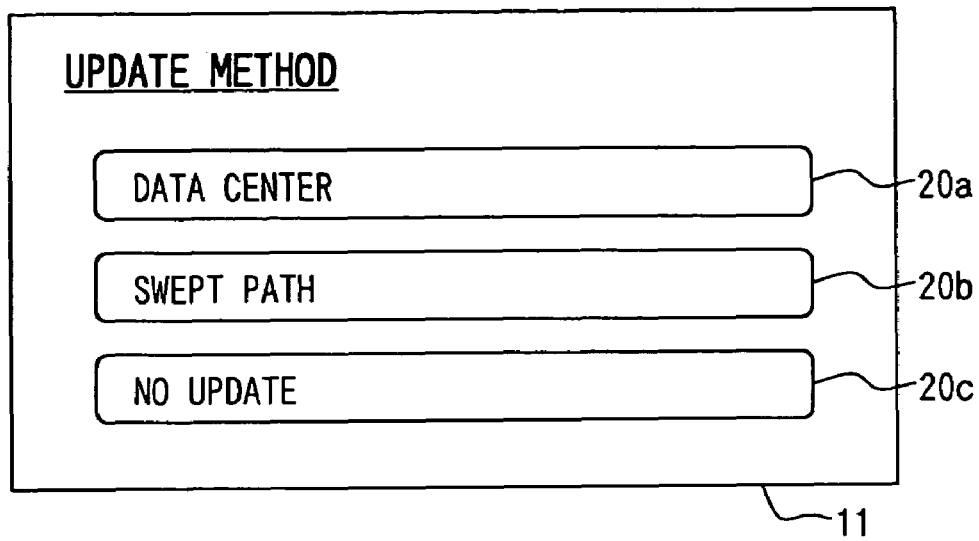
FIG. 5 is an input window used in the map display device.

The controller 2 updates the map data by incorporating the vehicular swept path outside of the road to the existing map data when the map data update method is specified as the "Swept Path." The vehicular swept path outside of the road on the existing map data is incorporated in the map data in step S31 in FIG. 4B, and the update of the map data completes in step S32.

The updated map data may incorporates the vehicular swept path outside of the existing road on the map either by including the updated portion of the data in an existing structure of the map data, or by storing the updated portion of the data in a separate structure from the existing map data. The updated map data stored in the separate structure may be incorporated to and displayed on the existing map when the updated portion of the map is used.

The controller 2 does not update the map data when it detects selection of "NO" button 21b (YES in step S13) before the elapsed time reaches the predetermined value. The controller 2 discards the vehicular swept path stored in the memory 12 in this step (step S13). The controller 2 stores the vehicular swept path outside of the road on the map in the memory 12 in step S19 when neither of the "YES" button 21a or "NO" button 21b is selected when the elapsed time reaches the predetermined value in step S14 (YES in step S14).

Figure 7:
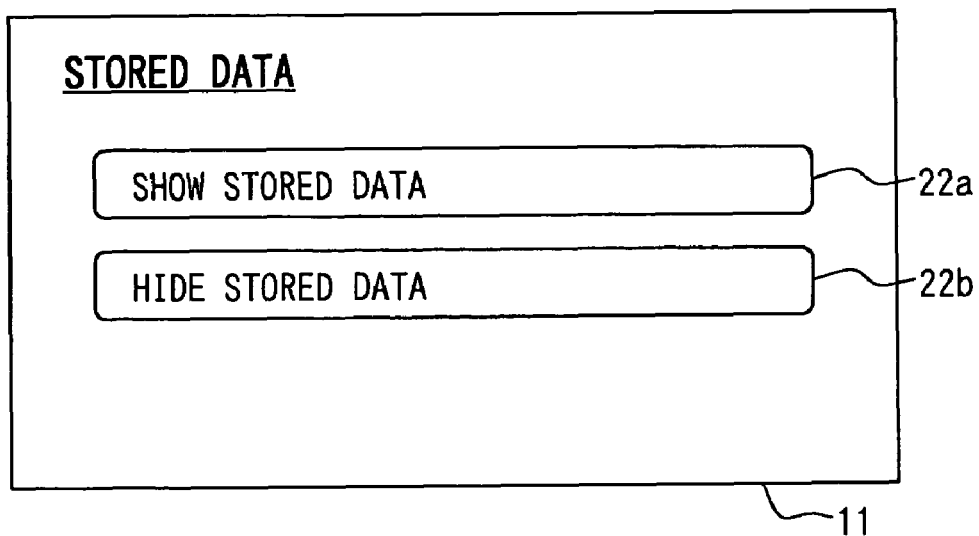
FIG. 7 is another input window used in the map display device.

The controller 2 displays a stored data window on the display 11 as shown in FIG. 7 when, for example, an ignition switch of the vehicle is turned on. The stored data window informs the user that the memory 12 has the stored data such as the vehicular swept path outside of the road on the map. The controller 2 updates the map data in a specified manner when the stored data is displayed upon receiving an input of selection of a "Show stored data" button 22a. The controller 2 confirms the update method by displaying the update method window on the display 11.

Figure 8A:
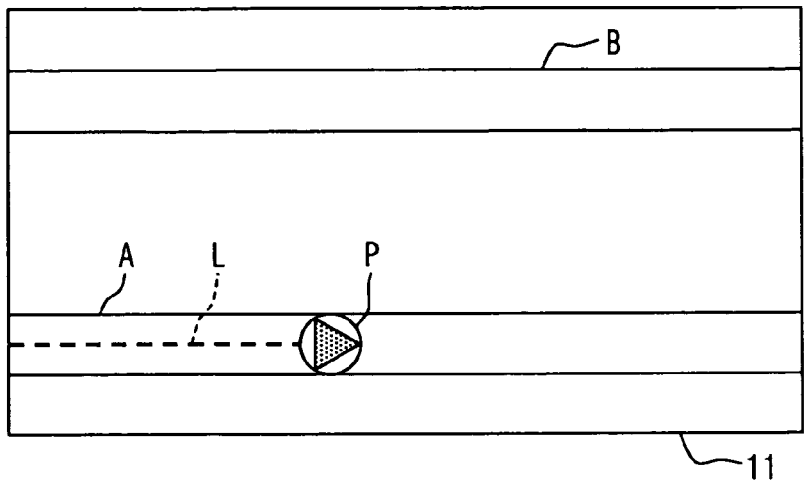
FIGS. 8A to 8C are illustrations of a vehicular swept paths shown on the maps.
Figure 8B:
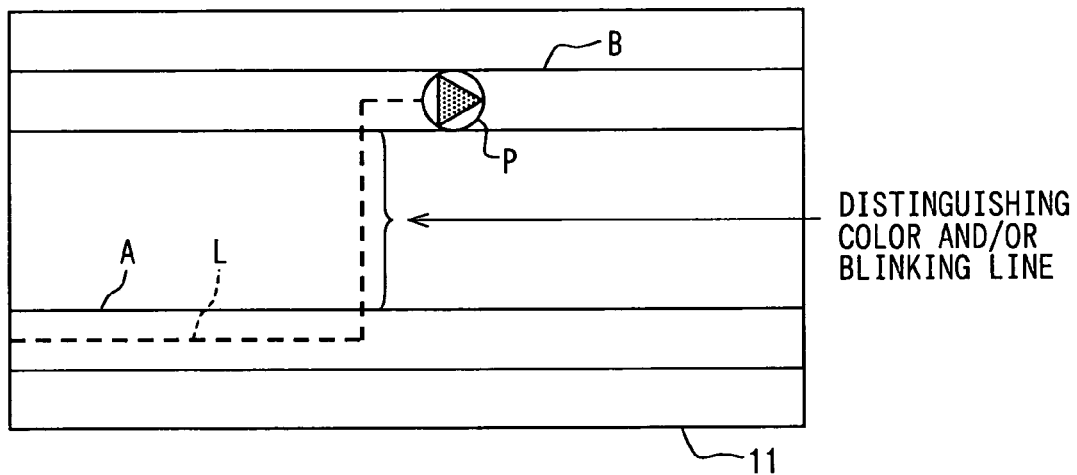
Figure 8C:
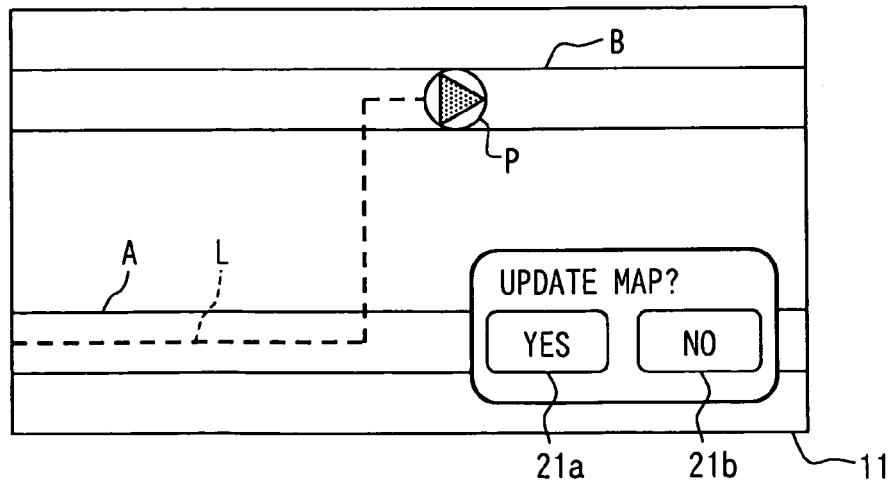

The stored data window displayed in the above-described manner on the display 11 may also be used when the subject vehicle returns to the road on the map as shown in FIGS. 8A to 8C. That is, the subject vehicle goes out of the road on the map in FIG. 8A, sweeps the path on the map in FIG. 8B, and returns to the road in FIG. 8C with the stored data window displayed for confirmation of updating the map data. In other words, the stored data window confirms the user of the update of the map data when the subject vehicle travels outside of the road on the map in a distance greater than the predetermined value, or for a period greater than the predetermined value. The stored data window also confirms the user of the update of the map data when the swept path of the subject vehicle reaches to another road on the map after sweeping a non-road area.

Further, the stored data window displayed on the display 11 may be used for confirmation of updating the map data when the subject vehicle goes out of the road under a predetermined traveling speed.

Furthermore, the vehicular swept path may be automatically stored in the memory 12 when the subject vehicle goes out of the road on the map in a traveling speed greater than a predetermined value, and may be incorporated to the map data later when the traveling speed of the subject vehicle becomes under the predetermined value upon receiving an affirmative input of updating from the user through the stored data window displayed on the display 11.

The navigation system 1 updates the map data in the above-described manner. That is, the navigation system 1 confirms the user of the update of the map data when the subject vehicle travels outside of the road on the map. Therefore, the vehicular swept path of the subject vehicle outside of the road on the map can be incorporated to the map data upon receiving an input of updating from the user without, for example, purchasing a map data.

The navigation system 1 updates the map data when the predetermined value of a distance outside of the road on the map has been traveled by the subject vehicle, or when the elapsed time of traveling outside of the road on the map has reached the predetermined value. The update of the map data takes place when the user affirmatively confirms the update by the input from the stored data window. The predetermined value of distance or the predetermined elapsed time is used, for example, to exclude a travel of the vehicle outside of the road for a small amount of time from the vehicular swept path for updating the map data.

The update of the map data is also confirmed by the stored data window when, for example, the subject vehicle goes out of the road on the map for a small distance. The user can prevent updating the map data on an occasion of parking in a parking lot or the like.

The navigation system 1 automatically stores the vehicular swept path outside of the road on the map when the user does not respond to the confirmation window in a predetermined period. In this manner, the navigation system 1 allows the user to concentrate on driving the subject vehicle when the user cannot use the confirmation window.

The navigation system 1 automatically stores the vehicular swept path outside of the road on the map when the subject vehicle travels in the traveling speed equal to or greater than the predetermined value. In this manner, the navigation system 1 allows the user to concentrate on driving the subject vehicle when the user cannot use the confirmation window.

The update of the map data takes place according to a setting of the navigation system 1 based on the input from the update method window. That is, the map data is updated either by the retrieved data from the data center 17 or by the vehicular swept path stored in the memory 12. In this manner, the map data of the navigation system 1 is updated to an actual condition of the road.

The current position of the subject vehicle is traced on the map to be distinguishably displayed on the display 11 in the navigation system 1. In this manner, the user clearly recognizes and realizes the vehicular swept path outside of the road on the map.

Although the present invention has been fully described in connection with the preferred embodiments thereof with reference to the accompanying drawings, it is to be noted that various changes and modifications will become apparent to those skilled in the art.

For example, the navigation system 1 may accept the user input for confirmation of the update of the map data through a voice. That is, a voice recognition device may be used for accepting the user input.

The stored data window may not only be displayed when the ignition switch is turned on by the user who has returned to the subject vehicle, but also be displayed when the ignition switch is turned off, or when the user uses a parking brake for parking the subject vehicle.

The update method window and/or the stored data window may take different appearances, or may be displayed in a heads-up display device.

For example, the update method window may be displayed in a smaller size on the display 11 when the navigation system is displaying a guidance. In this manner, the update method window may be used by the user when the user is free from driving operation for abiding by traffic regulations such as a stop sign, a stop light or the like.

Such changes and modifications are to be understood as being within the scope of the present invention as defined by the appended claims.

What is claimed is:

1. A map display device comprising:
   a display for displaying map data;
   a current position detection means for detecting a current position of a subject vehicle;
   a map data storage means for storing the map data for the display; and
   a map data process means for processing the map data,
   wherein the map data process means determines whether the subject vehicle is traveling outside of a road on a map displayed on the display based on the current position of the subject vehicle,
   wherein the map data process means updates the map data upon receiving an affirmative response to an inquiry for confirmation of an update of a portion of the map data including a path of the current position of the subject vehicle on the map,
   wherein the portion of the map data includes a vehicular swept path of the subject vehicle that does not belong to the road on the map, and
   wherein the map data process means updates the portion of the map data by receiving the map data delivered from a data distribution facility.

2. The map display device according to claim 1,
   wherein the map data process means issues an inquiry for confirmation to a user when the subject vehicle is determined to be traveling outside of the road either in a distance greater than a predetermined value or for a period greater than a predetermined value.

3. The map display device according to claim 1,
   wherein the map data process means displays the inquiry in an input window for a user input when the path of the subject vehicle is determined to be rejoining the road on the map.

4. The map display device according to claim 3,
   wherein the map data process means updates the map data upon receiving the affirmative response within a predetermined period after displaying the input window.

5. The map display device according to claim 4, further comprising a path storage means for storing a vehicular swept path,
   wherein the path storage means stores the vehicular swept path as a path data when the user does not respond to the inquiry within a predetermined period.

6. The map display device according to claim 5,
   wherein the map data process means displays the inquiry in the input window for the user input to update the map data by the path data in the path storage means when a predetermined condition is fulfilled.

7. The map display device according to claim 5,
   wherein the path storage means stores the vehicular swept path as the path data upon detecting that a speed of the subject vehicle is greater than a predetermined value.

8. The map display device according to claim 7,
   wherein the map data process means displays the inquiry in the input window for the user input to update the map data by the path data in the path storage means when the speed of the subject vehicle becomes smaller than a predetermined value.

9. The map display device according to claim 1, wherein the map data process means updates the portion of the map data by incorporating the path data in the portion of the map data.

10. The map display device according to claim 1, wherein the map data process means distinguishably displays the portion of the map data on the display.

11. A method of displaying a map in an automotive system comprising steps of:
    providing a display for displaying the map for a user;
    providing a position detection means for detecting positions of a subject vehicle;
    providing a path storage means for storing the positions as a path of the subject vehicle;
    determining whether the path belongs to a road on the map on the display; and
    incorporating the path in the map when the user gives an affirmative response to an inquiry for incorporation of the path that does not belong to any road on the map on the display,
    wherein the user allows or prohibits the automotive system to incorporate the path through an input window shown on the display, and
    wherein the automotive system allows the user to respond to the confirmation of incorporation of the path for a predetermined period.

12. The method according to claim 11,
    wherein the automotive system allows the path to be stored in the path storage means when the user does not respond to the confirmation of incorporation of the path for the predetermined period.

13. The method according to claim 12,
    wherein the automotive system allows the user to incorporate the path stored in the path storage means after confirmation in a predetermined occasion.

* * * * *